United States Patent [19]

Findlay

[11] Patent Number: 5,411,127
[45] Date of Patent: May 2, 1995

[54] ESCALATORS

[75] Inventor: Alexander Findlay, Auckland, New Zealand

[73] Assignee: Escalator Advertising Limited, Auckland, New Zealand

[21] Appl. No.: 275,403

[22] Filed: Jul. 15, 1994

[30] Foreign Application Priority Data

Aug. 5, 1993 [NZ] New Zealand ......................... 248337

[51] Int. Cl.⁶ ............................................. B66B 23/12
[52] U.S. Cl. .................................. 198/333; 198/502.1
[58] Field of Search ............................... 198/333, 502.1

[56] References Cited

U.S. PATENT DOCUMENTS 5,176,239 1/1993 Findlay et al. ................. 198/333 X

FOREIGN PATENT DOCUMENTS

4314772 11/1993 Germany ............................. 198/333
2092979 8/1982 United Kingdom ................ 198/333
92-022491 12/1992 WIPO ................................. 198/333

Primary Examiner—Cheryl L. Gastineau
Attorney, Agent, or Firm—Young & Thompson

[57] ABSTRACT

A passenger conveying device has a plurality of interacting movable steps, at least one of the steps having a cover plate fastened to an exterior surface thereof. The cover plate is fastened by a projecting flange adjacent an edge of said cover plate and a complementary channel in which the flange is engaged. The cover plate is pivotally movable relative to the step on that engaged flange and channel. At least one fastener passes through an aperture in the cover plate spaced away from that edge, to fasten onto the step. The cover plate is light transmissive, and the step displays indicia behind the cover plate.

4 Claims, 6 Drawing Sheets

ESCALATORS

FIELD OF THE INVENTION

This invention relates to the field of advertising, and more particularly to improved means for providing indicia on an escalator.

PRIOR ART

International application PCT/GB92/01037 published under the Patent Cooperation Treaty WO92/22491 discloses a passenger conveying device having a plurality of interacting escalator steps, each step having a defined external profile allowing relative movement between adjacent steps wherein the steps have been modified for displaying indicia to a passenger on the steps. The indicia comprises a plurality of advertising signs on the riser and/or tread of the escalator. The sign is provided with a transparent cover which is positioned on the step so as not to interfere with the relative movement of adjacent steps on the escalator or the cyclic movement of the escalator itself. The cover has an external profile corresponding to the defined external profile of the steps.

OBJECT

It is an object of the present invention to go at least pan way towards providing novel or improved means for providing indicia on an escalator, or at least to provide the public with a useful choice.

It is a further object for the present invention to go at least partway towards providing novel or improved means for safety on an escalator or, at least to provide the public with a useful choice.

STATEMENT OF INVENTION

In one aspect the present invention provides a passenger conveying device such as an escalator or travelator having a plurality of interacting movable steps, at least one of said steps having a cover plate fastened to an exterior surface thereof, characterised in that said cover plate is fastened by means including in combination: a projecting flange at or adjacent an edge of said cover plate and a complementary channel in which said flange can be engaged, with said cover plate being pivotally movable relative to said step on said engaged flange and channel; and at least one fastener passing through an aperture in said cover plate spaced away from said edge, to fasten onto said step.

Preferably said cover plate is transparent or translucent, and said step includes means for displaying indicia behind said cover plate.

Preferably two or more said cover plates are provided, each including a said projecting flange which can be engaged with a single said channel on said step, and each said cover plate further including complementary engagement means on opposing edges, by which said cover plates can be engaged with each other.

PREFERRED EMBODIMENTS

The following is a description of preferred forms of the present invention, given by way of example only, with reference to the accompanying drawings, in which:

FIGS. 9 to 12: illustrate details of the example of FIG. 7.

FIRST PREFERRED EMBODIMENT

A preferred manner of manufacture for new escalator steps is die-casting substantially the whole step by way of high pressure injection moulding. Nevertheless, there are other methods of construction of escalator steps which provide sub-frame and sub-frame modular step models, and which in some countries still represent a significant proportion of the escalator market. A sub-frame step differs from a single cast step in that the tread and riser elements are manufactured separately and are bolted onto a sub-frame carriage.

Production of new sub-frame steps is decreasing in favour of manufacturing a single cast step, because of the distinct advantages in relation to both weight and cost of manufacture, however because most escalator steps have a fairly long lifetime, it will be some time before existing sub-frame steps are substituted for newer single cast models.

The present invention relates to providing indicia on both single cast and sub-frame escalator steps. There is a need for improved apparatus and method for different models of sub-frame escalator steps, which the present invention in its preferred forms is intended to go at least partway towards meeting.

Figure 1:
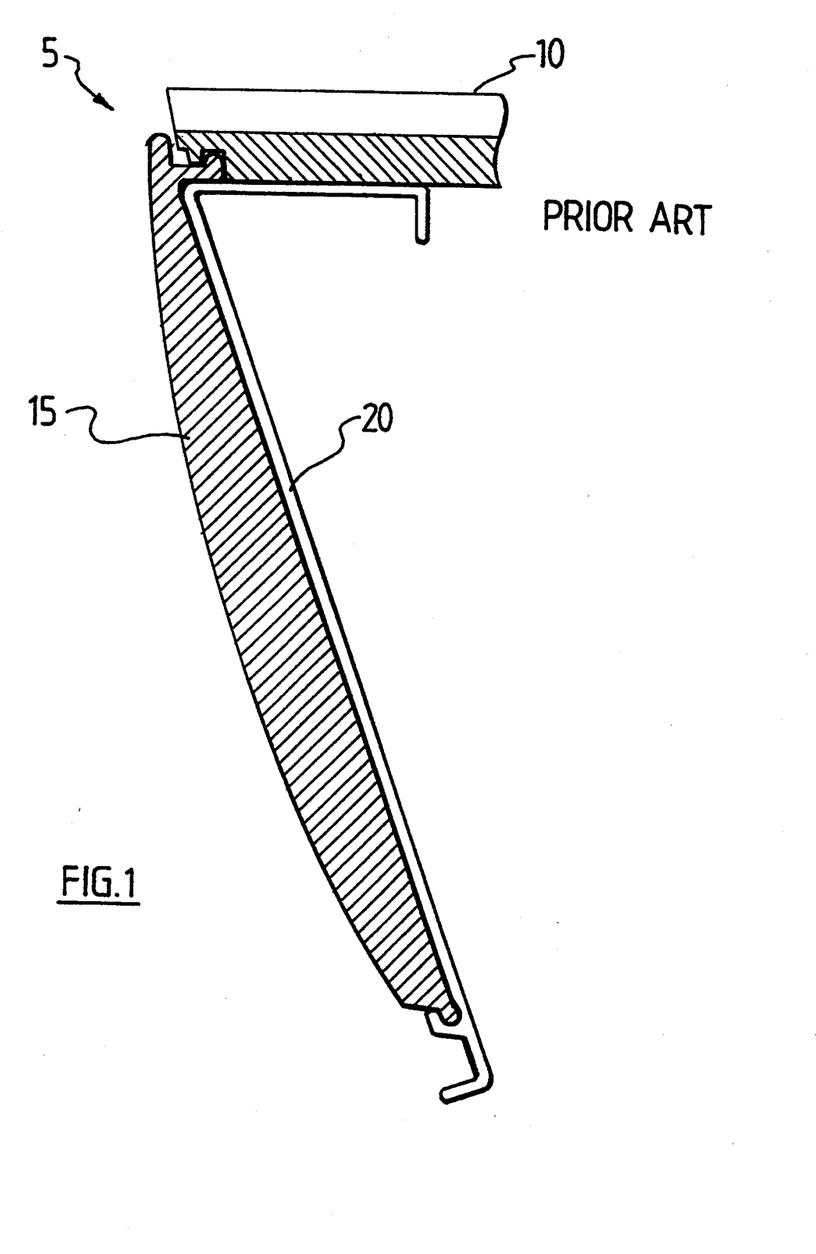
FIG. 1: illustrates prior art in side view.

FIG. 1 illustrates the prior an in side view in the form of a sub-frame escalator step 5, having demountable tread 10 and riser 15, and reinforcing plate 20. The actual carriage onto which the tread and riser elements are bolted is not shown. Reinforcing plate 20 provides a backing surface behind riser 10 and gives additional support to the overall step structure.

With most models of sub-frame step, removal of the riser can only be achieved by first unbolting the tread pan.

A sub-frame modular escalator step is not dissimilar to the step illustrated in FIG. 1 and differs only in that the escalator step would be constructed in two or three segments, each with its own demountable riser and tread pans. The aforementioned segments would be bolted together under the step to make one complete escalator step.

Figure 2:
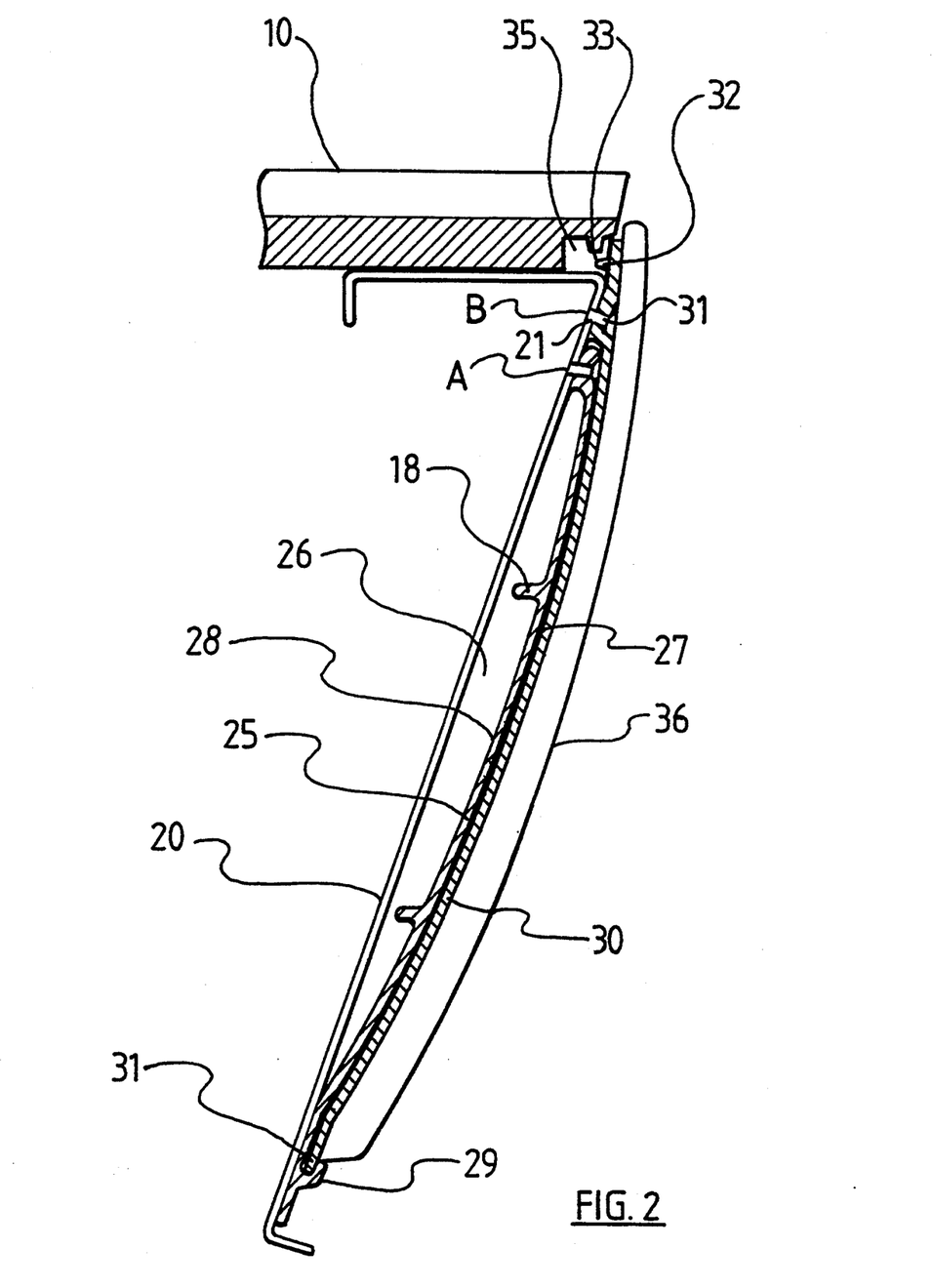
FIG. 2: illustrates a preferred form of the present invention in side view.

FIG. 2 illustrates a preferred form of the present invention and shows how a sub-frame step can be constructed so as to allow indicia, preferably in the form of an advertising sign, to be displayed on the riser of the step.

In FIG. 2 the original riser 15 has been removed from the step by first unbolting and lifting the tread 10. The removed riser can be discarded or retained depending on the circumstances in each case. The advantage of the present invention is that the escalator owner is provided with more flexibility with respect to how he can use the escalator to earn profit through advertising, but retain the option to restore the escalator to its pre-modified condition at substantially no cost, should it be necessary to do so.

The original riser 15 is replaced by insertion of new extruded backing plate 25, optional gusset(s) 26, indicia 27, moulded cover plate 30, preferably manufactured from a transparent plastics material such as polycarbonate, and weather seal 35. Preferably the backing plate is pre-fabricated in a single extrusion for the appropriate length of step and has a radius of curvature substantially similar to the original riser pan which was removed. An extrusion process is preferred because of the fine dimensions which can be obtained by extruding metal as opposed to a casting or rolled process. Even though reinforcing plate 20 already exists in the structure of the step, insertion of an additional backing plate is preferred because of the support it provides to cover plate 30 and to any sign (not shown) placed between the backing plate and cover plate. The backing plate itself could provide an appropriate surface for displaying indicia, if required.

Alternatively the existing reinforcing plate could provide a backing surface for indicia, however because the shape of the reinforcing plate does not allow it to support the cover plate directly, the dimensions of any substituted cover plate would have to be altered for this purpose. Using plastics material to manufacture the riser, this could be achieved by moulding a very thick polycarbonate riser to replace the original. However this would be less preferred than the insertion of the extruded backing plate mentioned above and a plastics cover plate because:

a) the cost of manufacture of the thick polycarbonate riser would be very expensive, bearing in mind also any replacement cost thereafter for damage to the outer surface of the riser from normal wear and tear;
b) the lensing effect of thick plastics material;
c) in light of the fine tolerances involved in the manufacture of escalator steps, any weight increase due to substituting this type of cover plate would require serious consideration as to the negative effects on the running of the existing escalator.

Backing plate 25 is preferably secured to the reinforcing plate 20 using suitable fastener means. In the present case the backing plate is fastened to the reinforcing plate at point A on the upper edge as shown in FIG. 2 with rivets, and is bolted along its wheel edge preferably using the existing bolts and bolt holes that were used to secure the original riser. Clearly other means of fastening plate 25 may be suitable, including welding, however the present method makes modification of existing sub-frame steps very efficient for the escalator owner and minimises conversion costs in relation to the escalator steps.

Welding directly onto the front or rear surface of the backing plate is less preferred because the high welding temperatures can distort the metal plate and, if the plate has been anodised to give a coloured effect, the anodising could be ruined.

To relieve this problem, plate 25 is preferably extruded having at least one backwardly disposed ridge 18. In the present example, ridges 18 project outwardly from inner surface 28 of plate 25 and run laterally substantially the length of the plate. Using these ridges, optional gusset plate(s) 26 can be lug welded into place to further support plate 25. In this way the lug welds do not directly contact the radiused portion of plate 25 and minimise any possibility of distortion in the plate from the welding process.

If the whole of the original riser is removed from the step, preferably at least one cleat would be restored to either end of the step, perhaps using a gusset on either end of the step. It would be preferred to have a metal cleat at either end so that if there is contact at either end of the step, between the step and the escalator, any contact is preferred to be metal against metal rather than non-metal against metal.

Furthermore, backing plate 25 has channel section 29 which is disposed forwardly from the outer surface of plate 25 and runs along substantially the entire length of the plate. The channel section is preferably adapted to receive a corresponding lip 31 at the base of cover plate 30. This cooperative arrangement is preferred because the cover plate can now be easily held in place without the need for fasteners at the base of the cover plate. Furthermore, supporting the cover plate in this way prevents the cover plate, signage or other indicia from falling into any space between adjacent escalator steps.

Naturally alternative supporting arrangements may be suitable for the cover plate alone or cover plate and sign, and these might incorporate welding support members below the cover plate or simply using appropriate fasteners such as DZUS screws which extend through an opening in a number of the grooved portions in the cover plate and screw into an opening in the backing plate.

Cover plate 30 would preferably be transparent and provide a hard wearing and non-scratch surface. It is preferred to have manufactured the cover plate(s) from polycarbonate material however other suitable materials may be used such as toughened glass or appropriate resin material which is a transparent or opaque. Colouration of the cover plate could be achieved depending upon whether or not the backing surface has been anodized for a particular occasion. Preferably the cover plate would be moulded with substantially vertically extending cleats or ribs 35 on the front face, so as to substantially replicate the radiused vertically extending cleats on the original riser. It would also be preferable for the shape of the back surface (not shown) of plate 30 to substantially match the radiused surface of plate 25.

As noted above, the cover plate is preferably constructed with a lip 31 at its wheel edge that can be accommodated inside corresponding channel section 29 at the wheel edge of the backing plate.

Plate 30 is fastened to the tread edge of reinforcing plate 20 at point B by way of suitable fastening means such as DZUS screws which extend through an opening 31 in the grooved portions in plate 30 to screw into corresponding openings 21 in plate 20.

DZUS screws are preferred in the present invention because they provide a tamper-proof fastening system which is quick release and vibration proof. The screws sit in counter-sunk openings 31 in grooved portions of cover plate 30, between cleats 36, and are accessible from the front of the step, with an appropriate tool. It will be appreciated that this allows the plate 30 to be unfastened and moved from a closed configuration as shown, to an open configuration, without unfastening or moving the tread 10. Furthermore, the plate 30 can pivot outwardly and rest in an open configuration in the channel 29 while a sign 27 is replaced or cleaned behind it.

Cover plate 30 includes a lateral ridge at its upper edge 32. When the cover plate is secured to reinforcing plate 25, ridge 33 is received by complimentary channel section 33 in weather seal 35. In the present example the weather seal is adapted for placement under tread edge 10 and to seal around ridge 32. The ridge projects outwardly from the back surface of the cover plate for substantially the length of the cover plate. When plate 30 is fastened to the step the weather seal provides a seal which substantially prevents entry of fine particles of dust, dirt and moisture, which may detract from the appearance of the signage.

Riser cover plates are preferably manufactured in short lengths so that at least two or three plates are required for example to restore the riser profile on a one metre long step. The side edges of the outer face of each plate are preferably cut in a complementary manner so that adjacent plates can be overlapped and inserted to restore the original riser. For narrower steps of the same profile, cover plates are preferably trimmed to size for cost and efficiency reasons.

Cover plates manufactured in this size are preferred because of the cost advantages to the escalator advertising operator. It is possible that cover plates will be damaged by hard wearing particularly in sites where there is a high flow of passenger traffic. Replacement of the damaged cover plate can easily be achieved by simply substituting a new plate however this is particularly costly if the cover plate has been manufactured in one piece. Consequently there would appear to be much greater cost savings in manufacturing the plates in smaller lengths and using those plates to replace any damaged portion of the restored riser.

Alternatively, a one piece cover plate could be used.

The weather seal can be manufactured from an appropriate synthetic material, or nylon or rubber, having a suitable degree of flexibility and bias. The weather seal is preferred particularly in relation to outdoor escalators such as escalators in underground sub-ways etc.

Preferably the weather seal would comprise a flame retardant.

The weather seal is adapted to cooperatively interact with lateral ridge 21 so that in use when the cover plate is secured onto the step, the weather seal is able to provide a seal which substantially prevents entry of fine particles of dirt and dust and moisture. It is preferable to have a weather seal because dust particles are able to enter behind the cover plate and detract from the indicia displayed. Using a weather seal substantially reduces the amount of dirt and moisture entering behind the cover plate.

In the present example, based on the model of an escalator sub-frame step shown, it was preferable to shorten the extruded backing plate and provide a larger than normal weather seal 35 which occupies that portion of the original riser which interlocked with the tread edge. This was preferred because of manufacturing tolerances of the backing plate.

Figure 3:
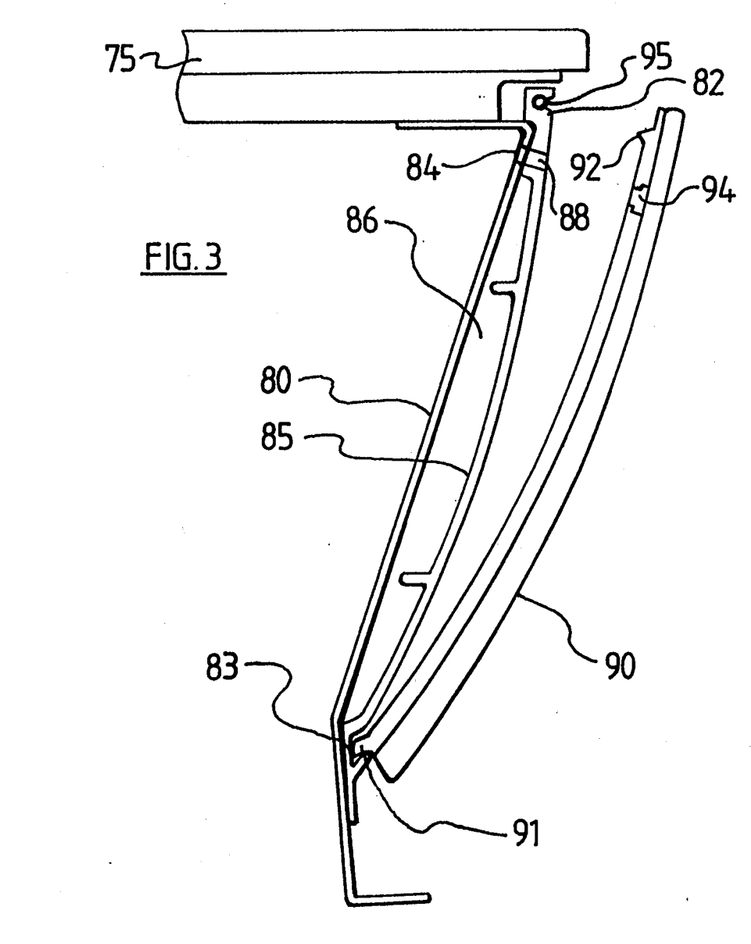
FIG. 3: illustrates one example of the present invention in side view and partial section, in an open configuration.

FIG. 3 illustrates another construction of an existing sub-frame escalator step, identified as a "MITSUBISHI sub-frame modular step" and shows a modified step as described above, having demountable tread 75, reinforcing plate 80, new inserted extruded backing plate 85, optional gusset 86, cover plate 90, and weather seal 95. The pre-existing riser element (not shown) has been unbolted and removed. Indicia in the form of a sign or otherwise is also not shown.

Figure 4:
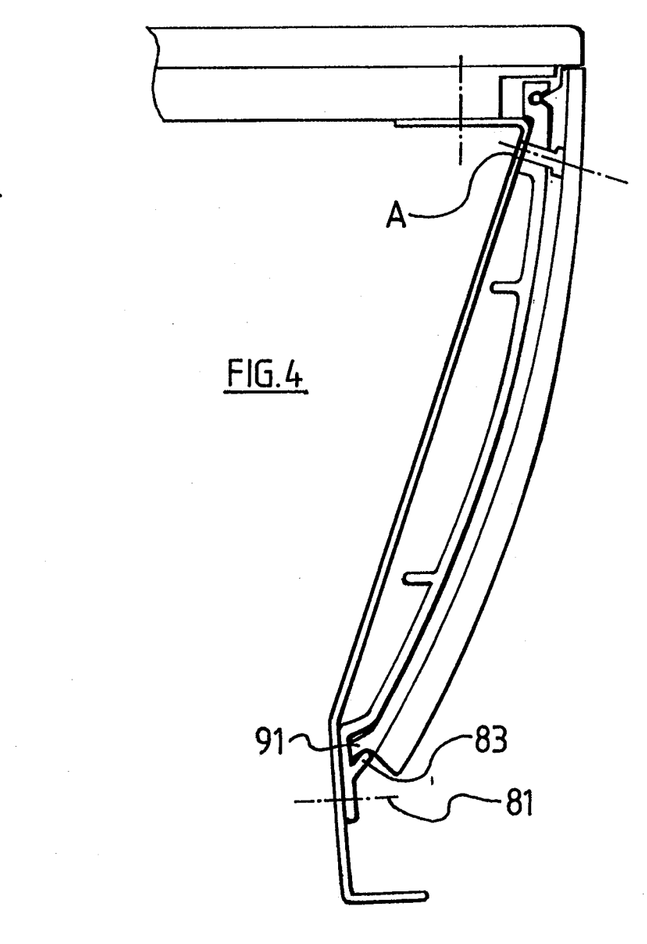
FIG. 4: illustrates the example of FIG. 3 in a closed configuration.

Extruded backing plate 85 is secured to reinforcing plate 80, preferably using existing bolt holes 81 at either end of the reinforcing plate as shown in FIG. 4. Preferably the backing plate comprises a lateral channel section 83 substantially along its wheel edge to receive lip 91 of cover plate 90.

As shown in FIGS. 3 and 4, a new extruded backing plate is provided with a channel section 82 at the tread edge of plate 85 into which is placed weather seal 95. The shape of the channel section is such that complimentary lip 92 is accommodated by channel section 82 when fastening the cover plate as shown in FIG. 3B at point A, with a fastener passed through an opening 94 in the cover plate 90, opening 88 in the backing plate 85, and opening 84 in the reinforcing plate 80, fixing the whole riser assembly together.

One of the advantages of inserting an extruded backing plate in relation to modular escalator steps is that the backing plate is a one-piece extrusion which provides further support to the modular step which has only been bolted together along its wheel struts.

Figure 5:
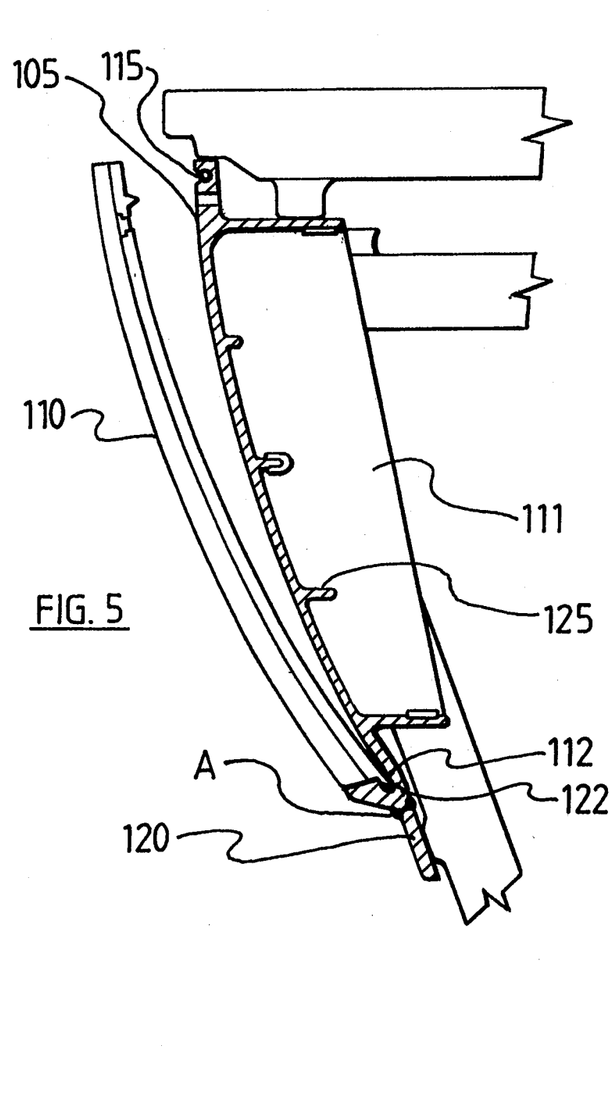
FIG. 5: illustrates a further example of the present invention in side view and partial section in an open configuration.
Figure 6:
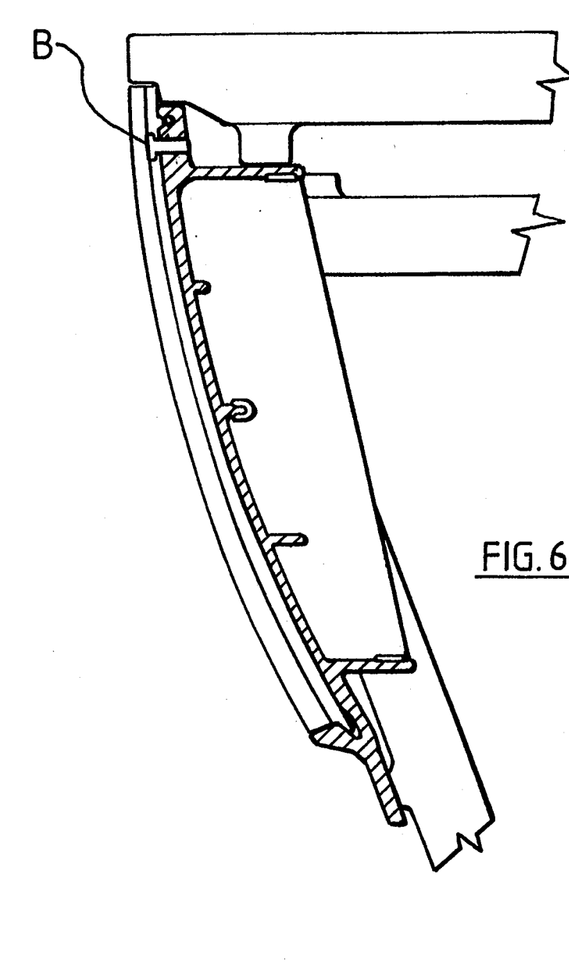
FIG. 6: illustrates the example of FIG. 5 in a closed configuration.

FIG. 5 illustrates the construction of a "MITSUBISHI" sub-frame step. FIGS. 5 and 6 show the step with the riser in an open and closed position respectively.

This model is similar to the earlier "MITSUBISHI" sub-frame model in FIGS. 3 and 4 above however it has an original one piece riser (not shown) and the riser and tread parts are bolted directly onto the sub-frame structure without the addition of a reinforcing plate. The original riser (not shown) has been unbolted and removed from the step and replaced with new inserted extruded backing plate 105, cover plate 110, gusset 111 and weather seal 115. A support member 120 is pre-fabricated of cast alloy and bolted to the existing sub-frame of the step using the existing bolt holes for the original riser. The backing plate 105 is welded to support element 120 at point A and is also bolted to the sub-frame structure using existing bolt holes in the tread. Gusset 111 is welded to extruded ridges 125 backwardly disposed from the radiused plate 105. Lug welds serve to hold the gusset(s) in place. This is preferable because welds near the radiused surfaces of backing plate 105 could distort the backing plate because of a high temperatures used in the welding process. Consequently lug welding the gussets in place at points remote from plate 105 relieves that problem and also provides the whole step structure with further support by the addition of the gusset(s). In a typical escalator step of this sort three or four gussets would be welded into place in this manner.

The cover plate 110 is secured to backing plate 105 at point B, and by engagement of lip 112 on the cover plate 110 in channel 122 on the backing plate 105.

Figure 7:
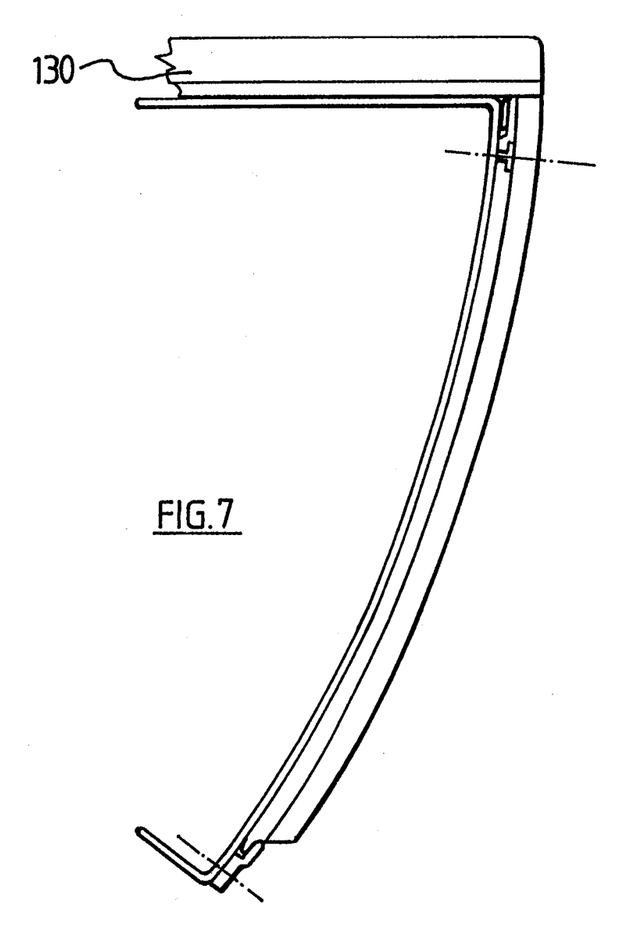
FIG. 7: illustrates yet a further example of the present invention in side view, and partial section, in a closed configuration.
Figures 8, 9:
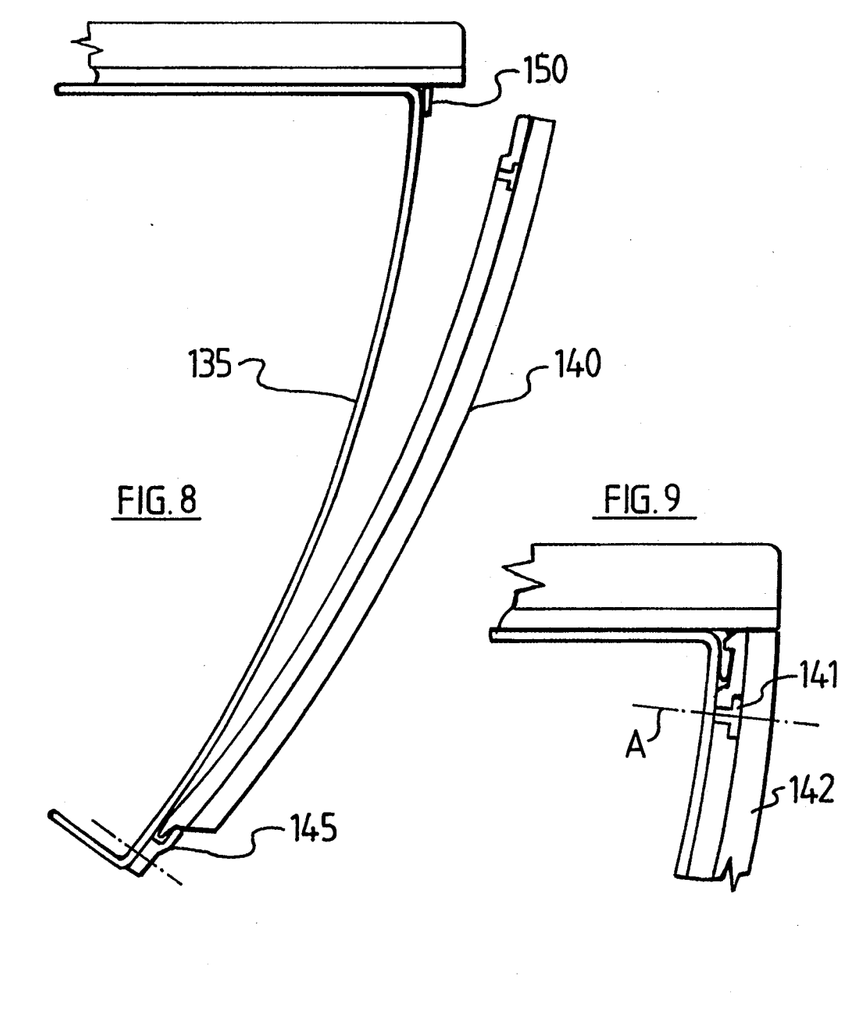
FIGS. 9 to 12: illustrate details of the example of FIG. 7. configuration.

FIGS. 7 and 8 show yet another specific construction of sub-frame step known as a "MONTGOMERY" step having a more simple demountable tread and riser elements, in a first closed position and a second open position respectively. Tread element 130, reinforcing plate 135, new riser element 140, new extruded supporting element 145, and weather seal 150 function in a manner similar to the equivalent parts of the constructions illustrated in FIGS. 5 and 6. Supporting element 145 is secured to existing reinforcing plate 135 by way of rivets, through apertures 148 which were used to fasten the original riser pan.

FIGS. 9 to 12 show details of the system of FIGS. 7 and 8, although it should be appreciated that these details of construction might also be applied to other systems within the scope of the present invention.

As shown in FIG. 9, the new riser element 140 is fastened directly to the reinforcing plate 135 with a fastener A passing through an aperture 141 in a grooved section between cleats 142 on the riser element 140. An aperture may be pre-drilled in the reinforcing plate 135, or alternatively just created when fastening the riser element 140 in place.

Figure 10:
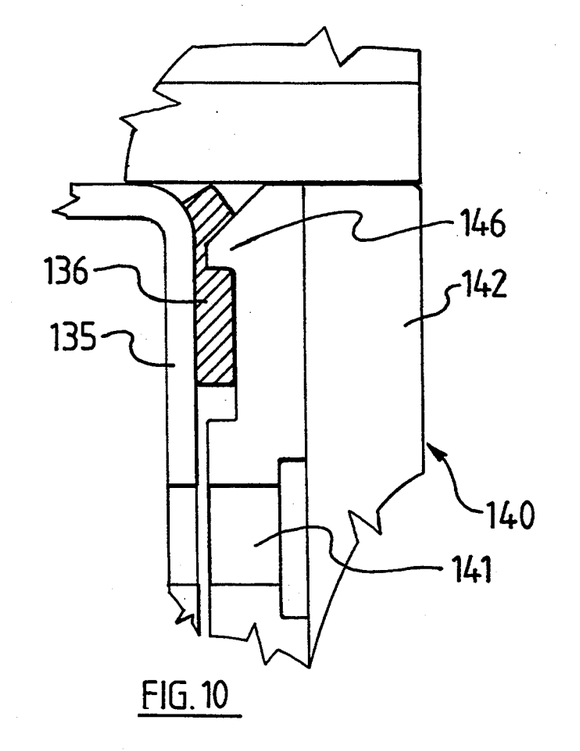

As shown in FIG. 10, a weather seal 136 is preferably provided between the reinforcing plate 135 and the new riser element 140 at their upper edges. Preferably the riser element is provided with a rearwardly projecting lateral ridge 146 to bite into the weather seal.

Figure 11:
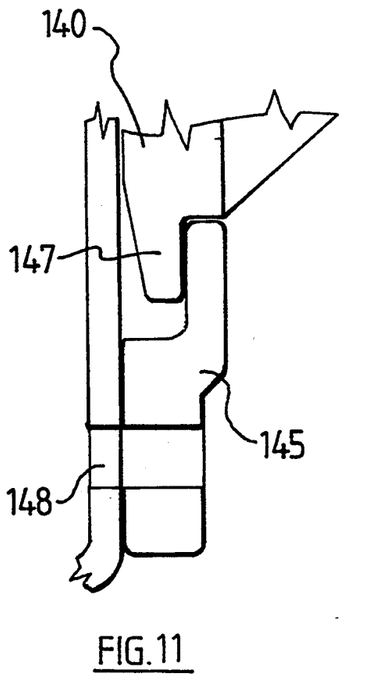

FIG. 11 shows detail of the interengaging system at the base of the riser element 140. A downwardly projecting lateral ridge 147 rests in a channel created by attachment of supporting element 145 to the reinforcing plate 136, with fasteners through apertures 148 in each. As shown, the downwardly projecting ridge 147 is tapered, to allow rocking or pivotal movement within the channel created by element 145, between the closed and open positions illustrated in FIGS. 7 and 8 respectively.

Figure 12:
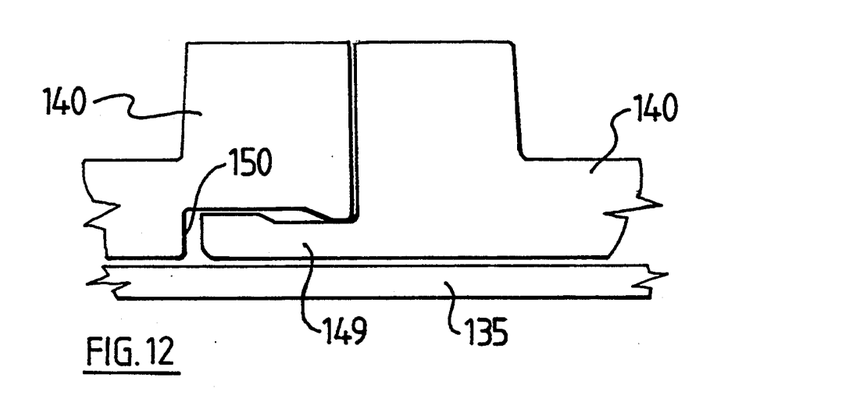

Finally, FIG. 12 shows detail of the system in plan view, illustrating abutting edges of two new riser elements 140, supported on a single reinforcing plate 135, where two or more short riser elements are used to make up the full span of a riser. As shown, each riser element 140 has a projecting flange 149 down one side edge, and a complementary recess 150 down the opposite side edge, whereby abutting riser elements 140 are interlocked.

In another form, the invention provides improved method and apparatus for modifying existing steps in an escalator.

Preferably substantially all components could be pre-fabricated for modification of each model of step.

In the case of a sub-frame step, modification would preferably consist of unbolting and removing the original riser and replacing with a one-piece extruded backing plate with optional gusset support.

Preferably the indicia and cover plate would be prepared and fastened as described above.

Preferably indicia would be prepared either for the cover plate, the backing plate or an independent sign. Depending upon the materials used to manufacture the backing plate, in the present example, aluminium is used to manufacture the backing plate, however if other materials such as high density plastics are used, the backing plate itself could display indicia and/or provide an additional visual affect for the riser on the step.

Preferably the cover plate would be releasably attached to the step using appropriate fasteners as to substantially prevent access to the indicia by passengers on the escalator.

In yet another form, the invention provides a pre-fabricated kit of pans for modification of new and existing escalator steps.

Preferably the kit of pans would consist of a one-piece extruded backing plate, at least one protective cover plate, preferably manufactured from transparent hard wearing non-scratch material such as polycarbonate or toughened glass or some other suitable resin, optional gussets to preferably restore and support the modified step, and a weather seal.

The weather seal preferably seals against a corresponding lateral ridge on the cover plate so as to weather proof the modified escalator step, substantially reducing the entry of dirt and moisture in behind the back of the cover plate.

In yet another form, the invention provides a method of manufacturing new steps for an escalator. Preferably this would involve moulding a new escalator step, and/or pre-fabricated components for a new escalator step, preferably including a pre-fabricated extruded backing plate. Preferably the riser of the new step would have an area without cleats supported by a substantially planar backing surface wherein the backing surface provides substantially along its wheel edge means for supporting a sign and/or cleated cover plate. More preferably the backing surface would also comprise a channel section along its tread edge adapted to receive a weather seal.

It will be appreciated that a wide variety of changes and modifications might be made to the above examples within the general spirit and scope of the invention, particularly in relation to the materials used to manufacture the pre-fabricated elements.

The advantage of this system is that it simplifies the maintenance of the escalator steps, particularly when the modified steps are used for displaying advertising and signage, and signs are replaced on a regular basis by service operators. Because there is a channel section along the wheel edge of the cover plate, the cover plate can be fastened substantially at the tread edge of the riser, without the need for fasteners at the wheel edges of the cover plate.

This not only makes fastening and unfastening of the cover plate simpler and quicker, but also allows the cover plate to be rested loosely in position in the channel section, and held there with one hand while positioning signage behind it and/or applying fasteners with the other.

The entire riser can be replaced using this system although it does still allow the option to cut out a window portion of the riser if required. However in the case of demountable escalator step the option to discard or keep the existing riser for other occasions is preferred. For example, existing sub-frame steps could be converted for a particular occasion perhaps if the building was a retail outlet which celebrated its birthday each year. Escalators could be converted for the birthday celebration and then substituted again with the pre-existing old riser for further use.

FUTURE DEVELOPMENTS

It is likely in the future that a die-cast or extruded, high density plastic step will be manufactured for new escalators. In general, internal construction of escalator machinery has made use of precision extrusions in aluminium, or aluminium and steel castings and fabrications. The aluminium profiles can be anodized in a variety of colours or powder-coated to a wide range of colours. The one-piece and modular die-cast aluminium steps have replaced the fabricated components of earlier escalators. This has allowed the tolerances between parts to be reduced and also given significant weight and cost savings on each step.

However, it will be appreciated that a die-cast, high density plastic one-piece or modular step could be produced, and a backing plate, cover plate and/or other components might be produced from the same materials within the scope of the present invention.

Other modifications might also be made to the modified riser design including the backing plate, weather seal and cover plate, to suit other specific types of escalator steps. The general scope of the invention, encompassing all such modifications, may be characterised by the following claims:

I claim:

1. A passenger conveying device having a plurality of interacting movable steps, at least one of said steps having a cover plate fastened to an exterior surface thereof, said cover plate being fastened by means including in combination: a projecting flange adjacent an edge of said cover plate and a complementary channel in which said flange is engaged, with said cover plate being pivotally movable relative to said step on said engaged flange and channel; and at least one fastener passing through an aperture in said cover plate spaced away from said edge, to fasten onto said step.

2. A passenger conveying device as claimed in claim 1, wherein said cover plate is light transmissive, and said step includes means for displaying indicia behind said cover plate.

3. A passenger conveying device as claimed in claim 1, wherein at least two said cover plates are provided on one said step, each including a said projecting flange which can be engaged with a single said channel on said step, and each said cover plate further including complementary engagement means on opposing edges, by which said cover plates can be engaged with each other.

4. A step for an escalator, said step having a cover plate fastened to an exterior surface thereof, wherein said cover plate is fastened by means including in combination: a projecting flange adjacent an edge of said cover plate and a complementary channel in which said flange can be engaged, with said cover plate being pivotally movable relative to said step on said engaged flange and channel; and at least one fastener passing through an aperture in said cover plate spaced away from said edge, to fasten onto said step.

* * * * *